No. 740,702. Patented October 6, 1903.

UNITED STATES PATENT OFFICE.

BRUNO RICHARD SEIFERT AND FRIEDRICH RUDOLF ENGELHARDT, OF RADEBEUL, GERMANY, ASSIGNORS TO CHEMISCHE FABRIK VON HEYDEN, ACTIENGESELLSCHAFT, OF RADEBEUL, NEAR DRESDEN, SAXONY, GERMANY.

ACETYLSALICYLATE OF SODIUM.

SPECIFICATION forming part of Letters Patent No. 740,702, dated October 6, 1903.

Application filed June 7, 1902. Serial No. 110,629. (No specimens.)

*To all whom it may concern:*

Be it known that we, BRUNO RICHARD SEIFERT and FRIEDRICH RUDOLF ENGELHARDT, subjects of the King of Saxony, and residents of Radebeul, near Dresden, in the Kingdom of Saxony, German Empire, have invented a new and useful Acetylsalicylate of Sodium, of which the following is a specification.

This invention relates to a new and useful substance for medical purposes, which substance consists of acetylsalicylate of sodium.

According to Kraut in the *Annalen* 150, pages 9 to 12, acetylsalicylic acid of the formula $C_2H_3OC_6H_4COOH$ is obtained by heating the salicylic acid with an acetylizing means, such as acetyl chlorid or acetanhydrid.

In the United States Letters Patent No. 644,077, dated February 27, 1900, it is suggested that the Kraut substance be not the real acetylsalicylic acid, but another compound, because Kraut does not state the true point of solidification; but, as a fact, it is to be stated that if worked according to Kraut's statement the real acetylsalicylic acid is obtained, such substance being the same as that claimed as a new one in the above-cited United States patent. The statement of a wrong point of solidification in the *Annalen* must probably be a clerical error or misprint, and such statement must, furthermore, originate in this, that Kraut's statement of the point of solidification has not been established on a pure product. The fact is that Kraut has recrystallized his acetylsalicylic acid out of boiling water, believing that this could be done without prejudice. As a matter of fact, however, the acetylsalicylic acid is split up by boiling water partly into acetic acid and salicylic acid. Kraut's point of solidification therefore does not refer to pure acetylsalicylic acid, but to an acetylsalicylic acid contaminated with salicylic acid. The melting-point and the point of solidification of acetylsalicylic acid will be considerably reduced by the slightest contamination. The low point of solidification of Kraut is due to this, as well as to the impurity of the salicylic acid of that time.

Kraut's statement that his acetylsalicylic acid on addition of $Fe_2Cl_6$ (ferric chlorid) would yield the same violet color as the salicylic acid also refers to the product recrystallized out of water, and consequently contaminated with salicylic acid, for the acetylsalicylic acid obtained according to Kraut's statement, but not recrystallized out of water, does not yield a violet color on addition of $Fe_2Cl_6$.

If salicylic acid is acetylized exactly according to the prescription given by Kraut in the *Annalen* 150, page 10, it will become necessary only to wash the raw product with cold water or alcohol or ether or benzene in order to directly obtain acetylsalicylic acid which does not deliver the reaction of ferric chlorid on salicylic acid and which melts at 135° centigrade. This substance if used as a medicament has the same effect as the salicylic acid, as the latter will separate from the substance within the human body. It is, however, known that free salicylic acid acts rather strongly irritating. The salicylic acid even keratinizes the skin, and therefore one uses as an internal medicine the salicylate of sodium instead of salicylic acid when large doses are necessary. The acetylsalicylic acid is likewise to be taken only in small doses.

Now we have produced according to our present invention an acetylsalicylate of sodium which has no acid reaction, and therefore no irritating effect. This substance was hitherto not accessible, at least not as a solid substance. Kraut mentions in the *Annalen* 150, page 11, that the acetylsalicylic acid will decompose carbonates and that by neutralizing an aqueous solution of soda with acetylsalicylic acid an aqueous solution of acetylsalicylate of sodium is obtained; but this aqueous solution does not permit the obtaining of a solid salt. On evaporation, even *in vacuo*, decomposition takes place.

We have already mentioned above that the acetylsalicylic acid will become split up into salicylic acid and acetic acid by boiling it with water. This splitting up will take place still more easily in the presence of alkali. By neutralizing acetylsalicylic acid with a solution of sodium carbonate only an aqueous solution of the sodium salt of the acetylsalicylic acid is obtainable, but no solid salt.

Kraut has not been able to get a solid salt, for his solution became decomposed by evaporation. Now, taking a new way, we have succeeded in obtaining the acetylsalicylate of sodium in the form of a solid salt. We dissolve or suspend the acetylsalicylic acid not in water, like Kraut, but in one of the following liquids, to wit: alcohols, acetones, ether, bisulfid of carbon, chloroform, carbonyl tetrachlorid, acetic ether, or hydrocarbons, and add to such liquid an alcoholic solution of equivalent quantities of caustic soda or of sodium alcoholate. Thus in contrast with Kraut we avoid water when neutralizing acetylsalicylic acid and use anhydrous solvents, and thus we obtain direct solid sodium salt of acetylsalicylic acid.

According to the quantity and quality of the solvents employed the acetylsalicylate of sodium will precipitate in solid form either immediately or after further addition of ether. The solid salt is separated by filtration, washed, and dried, or if it still shows an alkaline reaction it may be purified by being dissolved or suspended in an alcohol and by being again precipitated with ether.

Example: One part of acetylsalicylic acid is dissolved in thirty parts of ether or suspended in ten parts of ether and afterward neutralized by addition of equivalent quantities of an alcoholic soda-lye. In both cases, still before the whole soda-lye is added, the formation of a white crystal magma of acetylsalicylate of sodium will take place, which after being filtered is washed with ether and afterward dried. In correct working a product is obtained which if dissolved in water and mixed with ferric chlorid will not show the reaction of salicylic acid; otherwise the product must be dissolved in alcohol or must be mixed up with alcohol to form a magma and must afterward again be precipitated by ether.

The acetylsalicylate of sodium in solid form is a new technical product hitherto unknown, which does not offer any inconvenience to the trade, while Kraut's aqueous solution was little suitable for commercial purposes and for consumption, its liquid form and disposition to decompose rendering conveyance and application very difficult. The new salt is an odorless powder having a weak salty taste, contrary to the disagreeable sweet taste of salicylate of sodium. It has neutral reaction, is free of the irritating effects of the acetylsalicylic acid, insoluble in ether and benzene, but most easily soluble in cold water. The aqueous solution of the same will on addition of ferric chlorid yield no violet color as the salicylic acid does, but a flesh-colored precipitate of acetylsalicylate of iron. If hydrochloric acid is added to the aqueous solution, the acetylsalicylic acid of the melting-point 135° centigrade will be precipitated.

What we claim as our invention is—

The new product herein described consisting of solid acetylsalicylate of sodium, having the formula

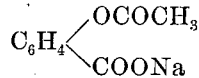

forming a white powder of neutral reaction, free from the intensive taste of salicylate of sodium having merely a slightly salty taste, insoluble in ether and benzene, highly soluble in cold water, yielding in watery solution no violet color on addition of ferric chlorid, and yielding acetylsalicylic acid of 135° centigrade melting-point on addition of hydrochloric acid.

In testimony that we claim the foregoing as our invention we have signed our names, in presence of two witnesses, this 24th day of May, 1902.

BRUNO RICHARD SEIFERT.
FRIEDRICH RUDOLF ENGELHARDT.

Witnesses:
PAUL E. SCHILLING,
HERNANDO DE SOTO.